3,385,863
VAT DYESTUFFS OF THE ANTHRAQUINONE-IMIDAZOLE SERIES

Arnold Wick, Therwil, Basel-Land, and Jacob Koch, Basel, Switzerland, assignors to Ciba Limited, Basel, Switzerland, a company of Switzerland
No Drawing. Filed Apr. 13, 1965, Ser. No. 447,911
Claims priority, application Switzerland, Apr. 22, 1964, 5,179/64; Feb. 25, 1965, 2,631/65
10 Claims. (Cl. 260—309.2)

ABSTRACT OF THE DISCLOSURE

Dyestuffs of the anthraquinoneimidazole series can be prepared by condensing, in a molar ratio of 2:1, 1:2-diaminoanthraquinones in which the amino groups are unsubstituted with compounds of the formula (1)     Y—A—X—A—Y in which the symbols A represent aryl residues, X represents a direct linkage or an acyclic bridge and the symbols Y represent carboxylic acid or aldehyde groups or the functional derivatives thereof.

---

The present invention is based on the observation that valuable new vat dyestuffs of the anthraquinoneimidazole series can be prepared by condensing, in a molar ratio of 2:1, 1:2-diaminoanthraquinones in which the amino groups are unsubstituted with compounds of the formula (1)     Y—A—X—A—Y in which the symbols A represent aryl residues, X represents a direct linkage or an acyclic bridge and the symbols Y represent carboxylic acid or aldehyde groups or the functional derivatives thereof.

It is preferable to use 1:2-diaminoanthraquinones having the formula (2) 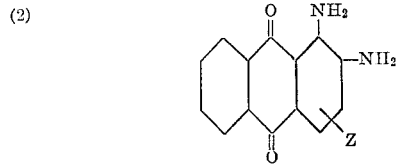

in which Z represents a hydrogen or halogen atom in 3- or 4-position or an alkoxy group. Examples are:

1:2-diaminoanthraquinone,
1:2-diamino-3-bromoanthraquinone,
1:2-diamino-3-chloroanthraquinone,
1:2-diamino-3-methoxyanthraquinone and
1:2-diamino-4-chloroanthraquinone.

The symbols Y in the compounds of the Formula 1 advantageously represent carboxyl groups or the functional derivatives thereof, for example, carboxylic acid ester groups, trichloromethyl groups or especially carboxylic acid halide groups, preferably carboxylic acid chloride groups. The symbols Y may also represent aldehyde groups or the functional derivatives thereof, for example, acetal groups or dichloromethyl groups.

Of special interest are dicarboxylic acids of the formula

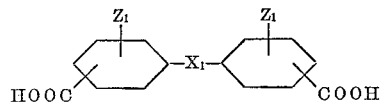

or the halides thereof, in which formula $X_1$ represents an oxygen or sulfur atom, an alkylene group or a —CO—, —SO$_2$—, —O—alkylene—O— or —OCH$_2$— group and $Z_1$ represents a hydrogen or halogen atom, or an alkyl or alkoxy group, or dicarboxylic acids of the formula

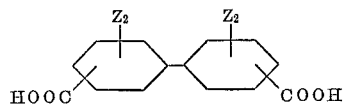

or the halides thereof, in which formula the symbols $Z_2$ represent hydrogen or halogen atoms or alkyl groups.

The following examples of compounds of the Formula 1 may be mentioned:

diphenyl-4:4'-dicarboxylic acid,
diphenyl-3:3'-dicarboxylic acid,
3:3'-dimethylphenyl-4:4'-dicarboxylic acid,
3:3'-dichlorodiphenyl-4:4'-dicarboxylic acid,
diphenylmethane-4:4'-dicarboxylic acid,
diphenylmethane-3:3'-dicarboxylic acid,
2:2'-dichlorodiphenylmethane-5:5'-dicarboxylic acid,
4:4'-dichlorodiphenylmethane-3:3'-dicarboxylic acid,
4:4'-dimethyldiphenylmethane-3:3'-dicarboxylic acid,
diphenylethane-4:4'-dicarboxylic acid,
diphenylethane-3:3'-dicarboxylic acid,
diphenyloxide-4:4'-dicarboxylic acid,
diphenyloxide-3:3'-dicarboxylic acid,
diphenylsulfide-4:4'-dicarboxylic acid,
diphenylsulfide-3:3'-dicarboxylic acid,
2:2'-dimethyldiphenylmethane-3:3'-dicarboxylic acid,
diphenylsulfone-4:4'-dicarboxylic acid,
diphenylsulfone-3:3'-dicarboxylic acid,
diphenylsulfone-3:4'-dicarboxylic acid,
2-chloro-diphenylsulfone-3:4'-dicarboxylic acid and
2-methyl-diphenylsulfone-3:4'-dicarboxylic acid.

Also of special interest are dicarboxylic acids of the formula

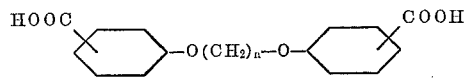

in which $n$ represents an integer of 2 to 6, for example,

1:2-diphenoxyethane-4':4'''-dicarboxylic acid,
1:2-diphenoxyethane-3':3'''-dicarboxylic acid,
1:3-diphenoxypropane-4':4'''-dicarboxylic acid,
1:3-diphenoxypropane-3':3'''-dicarboxylic acid,
1:3-diphenoxypropane-2':2'''-dicarboxylic acid,
1:4-diphenoxybutane-4':4'''-dicarboxylic acid,
1:4-diphenoxybutane-3':3'''-dicarboxylic acid and
1:4-diphenoxybutane-2':2'''-dicarboxylic acid.

Also suitable are dicarboxylic acids of the formula

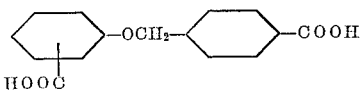

The new dyestuffs correspond advantageously to the formula

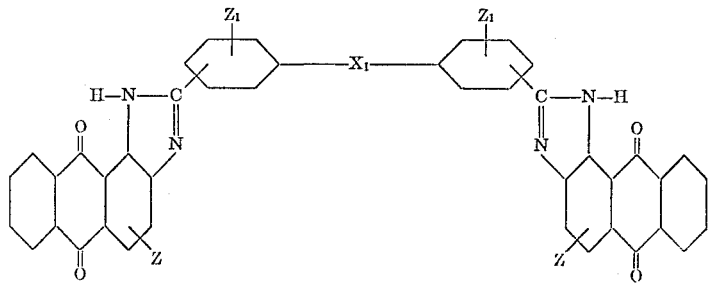

or

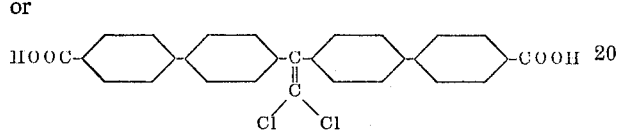

The components are advantageously condensed in the presence of a solvent or diluent and, if necessary, in the presence of an agent capable of binding water or acid. When using a dicarboxylic acid condensation is advantageously carried out in sulfuric acid or oleum. When using acid chlorides, aldehydes, dichloromethyl or trichloromethyl compounds, the reaction is advantageously carried out in an organic solvent, for example, nitrobenzene, trichlorobenzene or naphthalene. The reaction in sulfuric acid is advantageously carried out at a temperature within the range from 100 to 160° C. and the reaction in an organic solvent is advantageously carried out at a temperature within the range from 150 to 220° C.

in which $X_1$ is a member selected from the group consisting of lower alkylene, —CO—, —SO$_2$—, —O-lower alkylene-O— and —CH$_2$O—, Z is a member selected from the group consisting of hydrogen and halogen, $Z_1$ is a member selected from the group consisting of hydrogen, halogen and lower alkyl.

Of special value are the dyestuffs of the formula

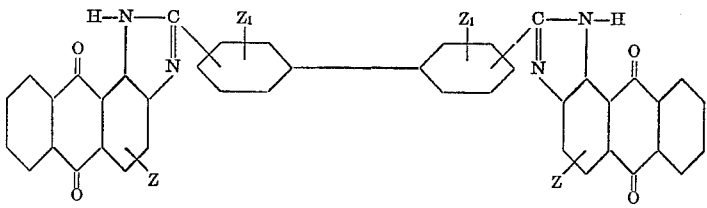

in which Z is a member selected from the group consisting of hydrogen and halogen and $Z_1$ is a member selected from the group consisting of hydrogen, halogen and lower alkyl or those of the formula

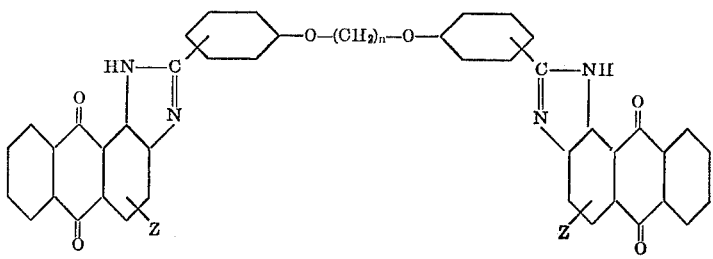

in which Z is a member selected from the group consisting of hydrogen and halogen and $n$ is an integer of 2 to 6 or those of the formula

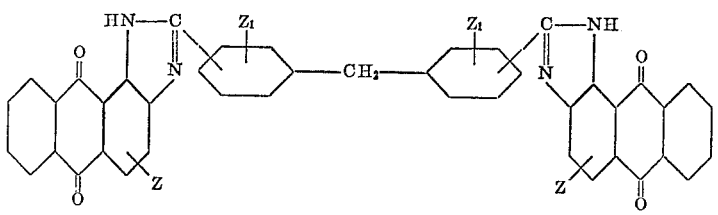

in which Z is a member selected from the group consisting of hydrogen and halogen and $Z_1$ is a member selected from the group consisting of hydrogen, halogen and lower alkyl.

Particular dyestuffs of the present invention are the compounds of the following formulae

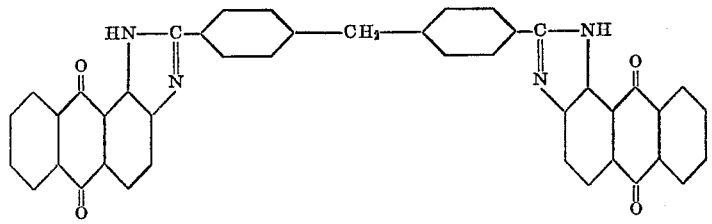

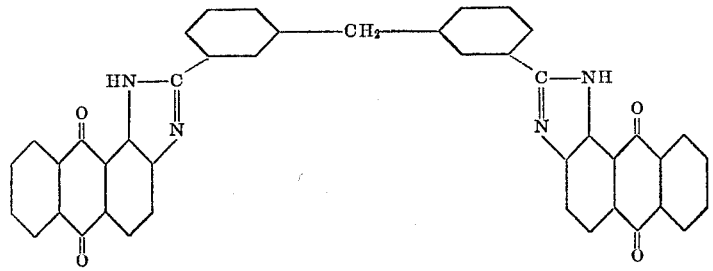

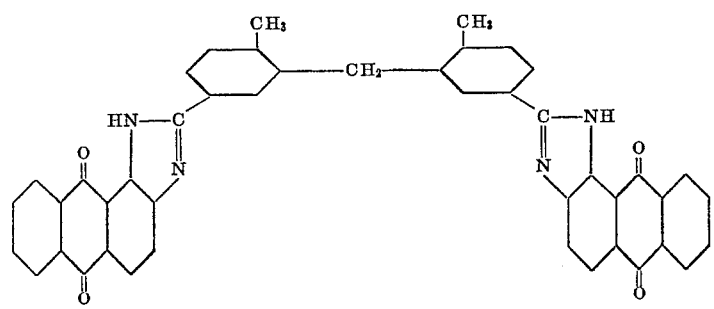

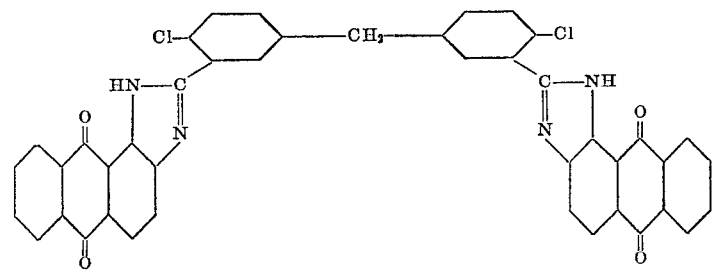

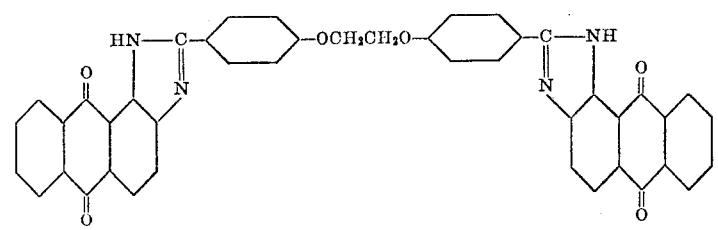

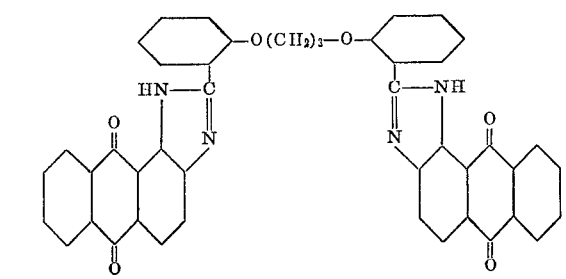

They are valuable vat dyestuffs that can be used in known manner per se or in the form of their leuco ester salts for dyeing and printing a very wide variety of fibers, especially cellulosic fibers. As a rule they yield strong, yellow to orange dyeings possessing good properties of wet fastness and an excellent fastness to light. In particular, the process of the invention yields a large number of dyestuffs of good tinctorial strength which produced a much sought after greenish yellow tint possessing good fastness to light. The new dyestuffs can also be used as pigments.

As compared to the known vat dyestuffs, which are obtained by condensation of 1 mol of diphenylmethane-4:4'-dicarboxylic acid chloride with 2 mols of 1-amino-anthraquinone, the best comparable dyestuffs of this invention are distinguished by greater tinctorial strength and fastness to light. As compared with the known vat dyestuffs which are obtained by condensing 1 mol of 1,2-diphenoxyethane-4':-4''-dicarboxylic acid chloride with 2 mols of 1-aminoanthraquinone, the best comparable dyestuffs of this invention excel by greater fastness to light, and they are of greater tinctorial strength than the known dyestuffs obtained by condensing 1 mol of diphenylsulfone-4:4'-dicarboxylic acid with 2 mols of 1-aminoanthraquinone.

The following examples illustrate the invention. Unless otherwise stated, the parts and percentages are by weight.

EXAMPLE 1

12.1 parts of 4.4'-diphenyldicarboxylic acid were suspended in 250 parts of anhydrous nitrobenzene; 14 parts of thionyl chloride and 0.5 part of dimethylformamide were added and the batch stirred overnight at 80 to 85° C. The resulting acid chloride solution was freed from excess thionyl chloride at 120° C. by blowing dry air through it and then added to a solution of 24 parts of 1:2-diaminoanthraquinone in 500 parts of anhydrous nitrobenzene at 120° C. during 30 minutes while stirring. The mixture was heated at 180° C. within 2 hours, kept at that temperature for one hour using a descending condenser and then stirred for another hour at 200° C. The reaction mixture was then allowed to cool, the precipitate was isolated by filtration, washed successively and thoroughly with nitrobenzene and alcohol and then dried. The dyestuff so obtained dyed cotton and regenerated cellulose strong, golden yellow tints tints when applied from an alkaline hydrosulfite vat.

Similar dyestuffs were obtained in the manner described above by using, instead of 4:4'-diphenyldicarboxylic acid, equivalent proportions of the dicarboxylic acids listed in the following table.

| No. | Parts | Dicarboxylic acids | Tint of dyestuffs |
|---|---|---|---|
| 1 | 12.1 | HOOC-C₆H₄-C₆H₄-COOH | Yellow. |
| 2 | 15.5 | HOOC-C₆H₃(Cl)-C₆H₃(Cl)-COOH | Do. |
| 3 | 14 | HOOC-C₆H₄-CO-C₆H₄-COOH | Do. |
| 4 | 15.3 | HOOC-C₆H₄-SO₂-C₆H₄-COOH | Greenish yellow. |
| 5 | 12.8 | HOOC-C₆H₄-CH₂-C₆H₄-COOH | Yellow. |
| 6 | 12.8 | (HOOC)C₆H₄-CH₂-C₆H₄(COOH) [2,2'-isomer] | Greenish yellow. |
| 7 | 16.3 | (HOOC)C₆H₃(Cl)-CH₂-C₆H₃(Cl)(COOH) | Do. |
| 8 | 16.3 | Cl-C₆H₃(COOH)-CH₂-C₆H₃(COOH)-Cl | Do. |
| 9 | 15.4 | HOOC-C₆H₄-CH₂CH₂-C₆H₄-COOH | Yellow. |
| 10 | 14.2 | (HOOC)C₆H₃(CH₃)-CH₂-C₆H₃(CH₃)(COOH) | Do. |
| 11 | 14.2 | CH₃-C₆H₃(COOH)-CH₂-C₆H₃(COOH)-CH₃ | Greenish yellow. |
| 12 | 13.5 | HOOC-C₆H₃(CH₃)-C₆H₃(CH₃)-COOH | Golden yellow. |
| 13 | 15.1 | HOOC-C₆H₄-OCH₂CH₂O-C₆H₄-COOH | Do. |
| 14 | 15.1 | (HOOC)C₆H₄-OCH₂CH₂O-C₆H₄(COOH) [2,2'-isomer] | Greenish yellow. |
| 15 | 15.8 | HOOC-C₆H₄-O(CH₂)₃O-C₆H₄-COOH | Golden yellow. |

| No. | Parts | Dicarboxylic acids | Tint of dyestuffs |
| --- | --- | --- | --- |
| 16 | 15.8 | 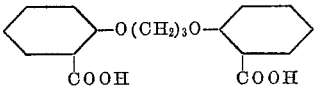 | Yellow. |
| 17 | 15.8 | 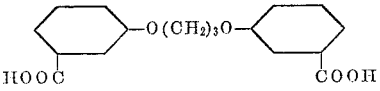 | Greenish yellow. |
| 18 | 16.5 | 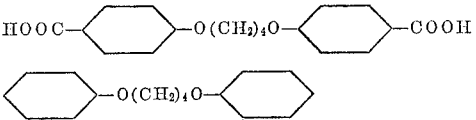 | Golden yellow. |
| 19 | 16.5 |  | Yellow. |
| 20 | 16.5 | 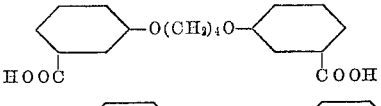 | Greenish yellow. |
| 21 | 17.2 | 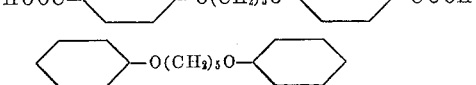 | Golden yellow. |
| 22 | 17.2 | 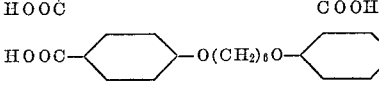 | Greenish yellow. |
| 23 | 17.9 | 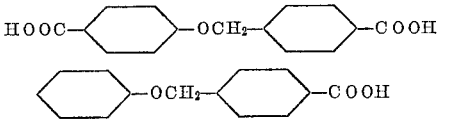 | Golden yellow. |
| 24 | 13.6 |  | Yellow. |
| 25 | 13.6 | 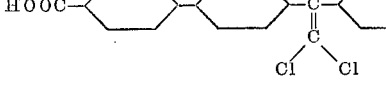 | Greenish yellow. |
| 26 | 24.9 |  | Do. |

Dicarboxylic acids No. 7, 8, 10 and 11, could be produced in a similar way to diphenylmethane-3:3'-dicarboxylic acid from the corresponding substituted benzoic acids by condensation with formaldehyde in concentrated sulfuric acid.

Dicarboxylic acids No. 13 to 23 were obtainable by condensing the corresponding ω:ω'-dihalogenalkanes, for example, the dibromo derivatives, with the sodium salts of the corresponding hydroxybenzoic acid esters with subsequent hydrolysis. Acids No. 24 and 25, hitherto unknown, were obtained in an analogous manner using para-chloromethylbenzoic acid methyl ester as condensation component.

Acid No. 26 was formed by condensing chloral with diphenyl-4-carboxylic acid according to the method described in German Patent No. 1,129,643 granted Oct. 31, 1962, to F. Zumstein and E. Assmann.

In order to produce products yielding a specially pure tint, the above dyestuffs may be further purified in known manner by reprecipitation from concentrated sulfuric acid and/or treatment with sodium hypochlorite solution. The purification of the dyestuff prepared with acid No. 6 is described by way of example:

10 parts of the crude dyestuff were dissolved by thorough stirring in 100 parts by volume of concentrated sulfuric acid. 37 parts of water were cautiously added to the solution during which process the temperature rose considerably. The sulfate of the dyestuff, which precipitated in the form of pale olive-green crystals when the reaction mixture cooled was isolated on an acid-resistant suction filter and washed with 75% sulfuric acid until the washing ran clear. The residue was then suspended in 1,000 parts of water, suction-filtered, washed with water until the washing ran neutral and then dried.

2 parts of the dyestuff so purified were finely ground in a ball mill with 50 parts of water and 1 part by volume of a 10% solution of the sodium salt dinaphthylmethane disulfonic acid. The mixture was stirred into 200 parts of water and the batch made slightly alkaline by the addition of a 10% sodium carbonate solution. 2 parts of commercial 10 to 15% sodium hypochlorite solution were then added and the whole stirred for 2 hours at room temperature. When a spot test on potassium iodide starch paper showed that the sodium hypochlorite had been consumed after this period, a second portion was added and stirring continued. When consumption of the latter portion took longer than 2 hours, the batch was heated to 50° C. and a similar procedure followed. Finally, the temperature was raised to 70° C. and stirring continued until consumption of the sodium hypochlorite took longer than 2 hours and the product became no lighter in color. The batch was then suction-filtered while hot, the residue thoroughly washed with hot water and then dried in vacuo at 80° C.

The dyestuff so purified dyed cotton and regenerated cellulose clear, greenish yellow tints possessing very good properties of fastness when applied from an alkaline hydrosulfite vat.

EXAMPLE 2

26 parts of diphenylmethane-3:3'-dicarboxylic acid and 48 parts of 1:2-diaminoanthraquinones were stirred for 8 hours at 150 to 160° C. in 500 parts by volume of concentrated sulfuric acid. After cooling the reaction mixture, 255 parts of water were slowly added dropwise with good stirring. The temperature rose to 90 to 100° C. After cooling the reaction mixture, the precipitate was isolated on an acid-resistant suction filter and washed with 70% sulfuric acid until the washing ran clear. The residue was then suspended in 2,500 parts of water, isolated by suction filtration, washed until the washing ran neutral and dried.

Subsequent treatment with sodium hypochlorite solution in the manner described in Example 1 yielded the same dyestuff as that obtained with acid No. 6 in the table given in Example 1.

EXAMPLE 3

4.8 parts of 1:2-diaminoanthraquinone were heated to 100° C. in 75 parts of nitrobenzene. 2.7 parts of 1:2-diphenoxyethane-4:4'-dialdehyde were then added gradually in small portions while stirring, the temperature was raised to 180° C. during 2 hours and the batch kept at that temperature for 1 hour. After cooling the reaction mixture to 80° C., the orange, crystalline product was isolated by suction filtration, washed with warm nitrobenzene, then with alcohol and dried.

The dyestuff thus obtained in excellent yield was the same dyestuff as obtained in Example 1 with acid No. 13 in the table.

EXAMPLE 4

12.8 parts of diphenylmethane-3:3'-dicarboxylic acid, 18 parts of thionyl chloride and 0.5 part of dimethylformamide were stirred for 2 hours at 110 to 115° C. in 300 parts of anhydrous nitrobenzene. The resulting acid chloride solution was freed from excess thionyl chloride at 120° C. by blowing dry air through it. 31.7 parts of 1:2-diamino-3-bromoanthraquinone were then added during 15 minutes and the same procedure followed as in Example 1.

The dyestuff so obtained dyed cotton and regenerated cellulose fast greenish yellow tints from an alkaline hydrosulfite vat.

By using 14.2 parts of dicarboxylic acid No. 10 in the table in Example 1 instead of diphenylmethane-3:3'-dicarboxylic acid, a dyestuff was obtained that dyed cotton and regenerated cellulose fast yellow tints when applied from an alkaline hydrosulfite vat.

By using 15.1 parts of dicarboxylic acid No. 13 in the table in Example 1 instead of diphenylmethane-3:3'-dicarboxylic acid, a dyestuff was obtained that dyed cotton and regenerated cellulose fast golden yellow tints when applied from an alkaline hydrosulfite vat.

What is claimed is:

1. A vat dyestuff of the formula

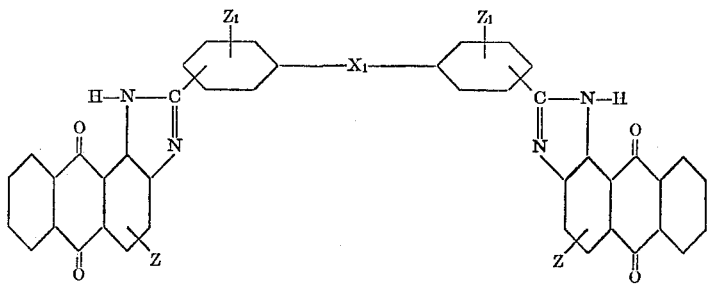

in which $X_1$ is a member selected from the group consisting of lower alkylene, —CO—, —SO$_2$—, —O—lower alkylene—O— and —CH$_2$—O—, Z is a member selected from the group consisting of hydrogen and halogen, $Z_1$ is a member selected from the group consisting of hydrogen, halogen and lower alkyl.

2. A vat dyestuff of the formula

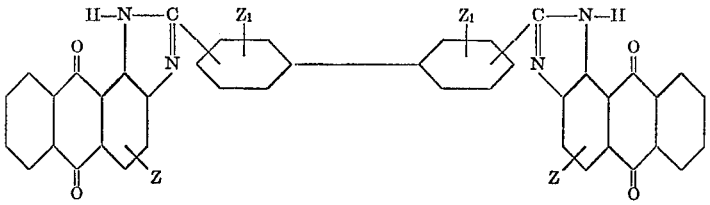

in which Z is a member selected from the group consisting of hydrogen and halogen and $Z_1$ is a member selected from the group consisting of hydrogen, halogen and lower alkyl.

3. A vat dyestuff of the formula

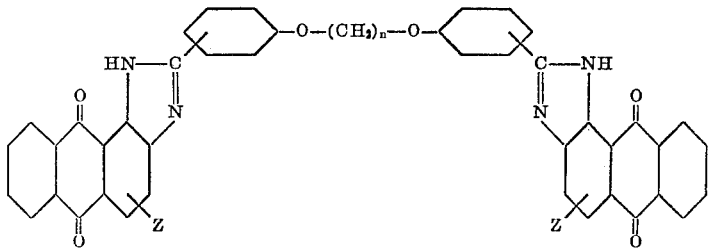

in which Z is a member selected from the group consisting of hydrogen and halogen and $n$ is an integer of 2 to 6.

4. A vat dyestuff of the formula

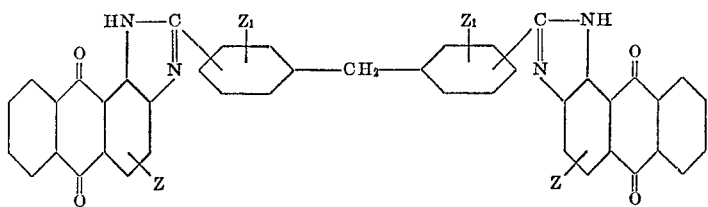

in which Z is a member selected from the group consisting of hydrogen and halogen and $Z_1$ is a member selected from the group consisting of hydrogen, halogen and lower alkyl.

5. The compound of the formula

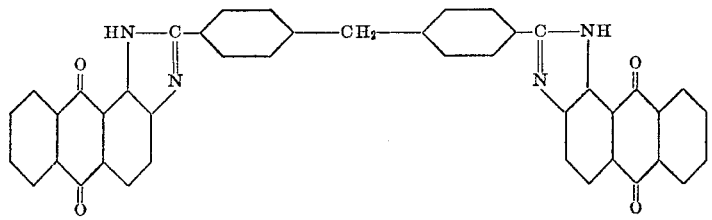

6. The compound of the formula

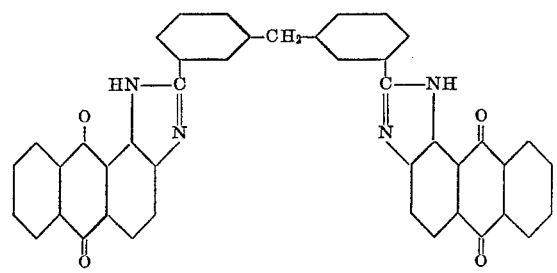

8. The compound of the formula

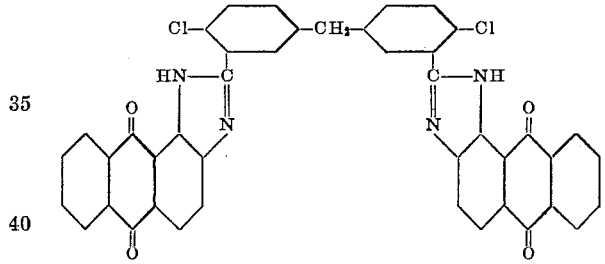

9. The compound of the formula

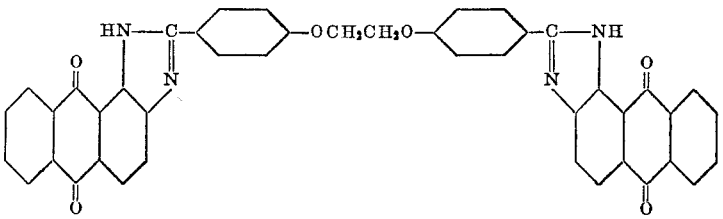

7. The compound of the formula

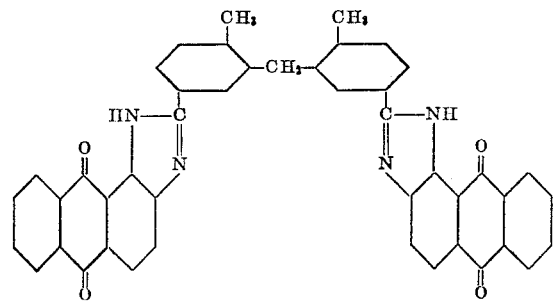

10. The compound of the formula

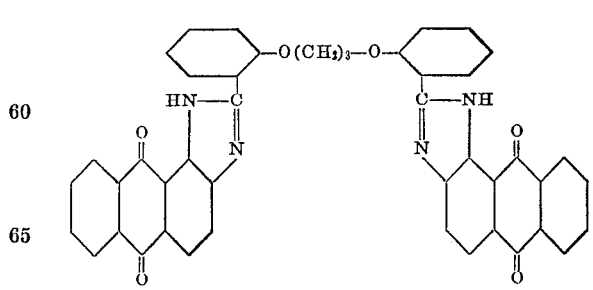

References Cited
UNITED STATES PATENTS
2,989,535   6/1961   Geeren et al. _____ 260—309.2

JOHN D. RANDOLPH, *Primary Examiner.*
N. TROUSOF, *Examiner.*

UNITED STATES PATENT OFFICE
CERTIFICATE OF CORRECTION

Patent No. 3,385,863　　　　　　　　　　　　　　　　May 28, 1968

Arnold Wick et al.

It is certified that error appears in the above identified patent and that said Letters Patent are hereby corrected as shown below:

Column 12, line 36, "-O=lower" should read -- -O-lower --; line 37, "-CH$_2$-O-" should read -- -CH$_2$O- --.  Column 13, lines 32 to 40, the lower left-hand portion of the formula should appear as shown below:

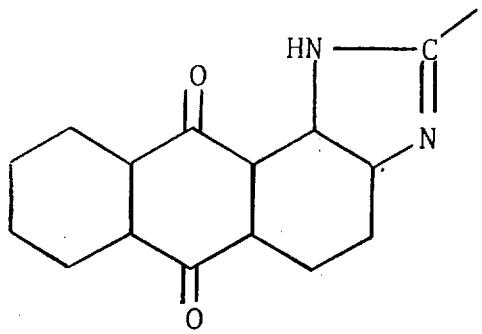

Signed and sealed this 20th day of January 1970.

(SEAL)
Attest:

EDWARD M. FLETCHER, JR.　　　　　　　　　WILLIAM E. SCHUYLER, JR.
Attesting Officer　　　　　　　　　　　　Commissioner of Patents